United States Patent
Fong et al.

(10) Patent No.: US 11,917,605 B2
(45) Date of Patent: Feb. 27, 2024

(54) MULTI-PATH DIVERSITY FOR UPLINK TRANSMISSIONS THROUGH SIDELINKS

(71) Applicant: QUALCOMM Incorporated, San Diego, CA (US)

(72) Inventors: Lik Hang Silas Fong, Bridgewater, NJ (US); Hua Wang, Basking Ridge, NJ (US); Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/087,755

(22) Filed: Nov. 3, 2020

(65) Prior Publication Data

US 2021/0136786 A1    May 6, 2021

Related U.S. Application Data

(60) Provisional application No. 62/930,934, filed on Nov. 5, 2019.

(51) Int. Cl.
*H04W 72/121*        (2023.01)
*H04W 76/11*         (2018.01)
(Continued)

(52) U.S. Cl.
CPC ......... *H04W 72/121* (2013.01); *H04L 1/0003* (2013.01); *H04L 1/0061* (2013.01);
(Continued)

(58) Field of Classification Search
CPC .............. H04W 72/121; H04W 24/08; H04W 72/1257; H04W 72/1289; H04W 76/11;
(Continued)

(56) References Cited

U.S. PATENT DOCUMENTS

| 10,616,869 B2 | 4/2020 | Chen et al. |
| 2009/0034498 A1 | 2/2009 | Banerjea et al. |

(Continued)

FOREIGN PATENT DOCUMENTS

| WO | 2017139097 A1 | 8/2017 |
| WO | 2018026991 A1 | 2/2018 |

(Continued)

OTHER PUBLICATIONS

International Search Report and Written Opinion—PCT/US2020/058914—ISA/EPO—dated Jan. 13, 2021.

(Continued)

*Primary Examiner* — Peter P Chau
(74) *Attorney, Agent, or Firm* — Patterson & Sheridan LLP

(57) ABSTRACT

Certain aspects of the present disclosure provide techniques for uplink transmissions through sidelinks for multi-path diversity. A method that may be performed by a base station (BS) includes configuring one or more groups of user equipments (UEs) of a group of UEs with a configuration of one or more resources. The one or more resources includes one or more sidelink channels between each of the UEs in the group of UEs and an uplink channel between the BS and each of the UEs in the group of UEs. The BS receives data from at least one UE in the group of UEs via at least one of the uplink channels, wherein the data is associated with a different UE.

24 Claims, 12 Drawing Sheets

(51) Int. Cl.
*H04W 24/08* (2009.01)
*H04L 1/00* (2006.01)
*H04L 5/00* (2006.01)
*H04W 72/23* (2023.01)
*H04W 72/50* (2023.01)
*H04W 92/18* (2009.01)

(52) U.S. Cl.
CPC ......... *H04L 5/0055* (2013.01); *H04W 24/08* (2013.01); *H04W 72/23* (2023.01); *H04W 72/535* (2023.01); *H04W 76/11* (2018.02); *H04W 92/18* (2013.01)

(58) Field of Classification Search
CPC ..... H04W 92/18; H04W 88/04; H04W 76/14; H04W 4/70; H04W 4/40; H04W 72/042; H04L 1/0003; H04L 1/0061; H04L 5/0055; H04L 1/0031; H04L 5/0094; H04L 5/0044
See application file for complete search history.

(56) References Cited

U.S. PATENT DOCUMENTS

| | | | |
|---|---|---|---|
| 2015/0319796 A1* | 11/2015 | Lu | H04W 74/02 370/330 |
| 2016/0338089 A1* | 11/2016 | Vos | H04L 1/1635 |
| 2018/0054237 A1* | 2/2018 | Tseng | H04W 72/085 |
| 2018/0206176 A1* | 7/2018 | Panteleev | H04W 72/1231 |
| 2018/0324882 A1 | 11/2018 | Gulati et al. | |
| 2019/0174423 A1* | 6/2019 | Zhang | H04W 52/146 |
| 2019/0223206 A1 | 7/2019 | Gupta et al. | |
| 2019/0297636 A1* | 9/2019 | Gupta | H04L 1/1893 |
| 2020/0059901 A1* | 2/2020 | Larsson | H04W 72/042 |
| 2020/0092685 A1* | 3/2020 | Fehrenbach | H04W 4/46 |
| 2020/0305165 A1* | 9/2020 | Inokuchi | H04W 72/0486 |
| 2020/0337040 A1* | 10/2020 | Yang | H04W 88/06 |
| 2021/0099847 A1* | 4/2021 | Uchiyama | H04W 4/44 |
| 2021/0167900 A1* | 6/2021 | Karaki | H04L 1/1819 |

FOREIGN PATENT DOCUMENTS

| | | | | |
|---|---|---|---|---|
| WO | WO-2018061521 A1 * | 4/2018 | | H04B 17/24 |
| WO | 2018124776 A1 | 7/2018 | | |

OTHER PUBLICATIONS

Samsung: "Discussion on Relay Functionality for D2D Group Communication", 3GPP Draft, R1-133118, Discussion on Relay Functionality for D2D Group Communication, 3rd Generation Partnership Project (3GPP), Mobile Competence Centre, 650, Route Des Lucioles, F-06921 Sophia-Antipolis, vol. RAN WG1, No. Barcelona, Spain, Aug. 19, 2013-Aug. 23, 2013, Aug. 10, 2013 (Aug. 10, 2013), XP050716334, 2 pages, Retrieved from the Internet: URL: http://www.3gpp.org/ftp/tsg_ran/WG1_RL1/TSGR1_74/Docs/. [retrieved on Aug. 10, 2013] paragraph [0002].

Huawei, et al., "Rel-17 Work Scope on NR Sidelink Enhancements for 5G V2X and Other Use Case", 3GPP TSG RAN Meeting #84, RP-191011 Rel-17 Work Scope on NR Sidelink Enhancements for V2X and Other Use Case_Near Final, 3rd Generation Partnership Project, Mobile Competence Centre, 650, Route Des Luciole, vol. TSG RAN, No. Newport Beach, USA, Jun. 3, 2019-Jun. 6, 2019, Jun. 2, 2019, XP051747224, 12 Pages, section 2.

* cited by examiner

MULTI-PATH DIVERSITY FOR UPLINK TRANSMISSIONS THROUGH SIDELINKS

CROSS-REFERENCE TO RELATED APPLICATION(S)

This application claims benefit of and priority to U.S. Provisional Application No. 62/930,934, filed Nov. 5, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for sending an uplink transmission through sidelinks.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include path diversity using sidelinks for uplink transmission.

One or more aspects of the subject matter described in this disclosure can be implemented in a method for wireless communication by a node. The method generally includes configuring one or more user equipments (UEs) of a group of UEs with a configuration of one or more resources. The one or more resources includes one or more sidelink channels between each of the UEs in the group of UEs and an uplink channel between the node and each of the UEs in the group of UEs. The method generally includes receiving data from at least one UE in the group of UEs via at least one of the uplink channels, wherein the data is associated with a different UE.

One or more aspects of the subject matter described in this disclosure can be implemented in a method for wireless communication by a first UE. The method generally includes receiving a configuration of one or more resources for a group of UEs including the first UE. The one or more resources includes one or more sidelink channels between the first UE and a second UE and an uplink channel between the first UE and a base station (BS). The method generally includes transmitting data to the BS and the second UE using at least one of the one or more resources.

One or more aspects of the subject matter described in this disclosure can be implemented in a method for wireless communication by a second UE. The method generally includes receiving a configuration of one or more resources for a group of UEs including the second UE. The one or more resources includes one or more sidelink channels between the second UE and a first UE and an uplink channel between the second UE and a BS. The method generally includes receiving data from a first UE via one of the one or more sidelink channels. The method generally includes retransmitting the data to the BS.

One or more aspects of the subject matter described in this disclosure can be implemented in an apparatus for wireless communications. The apparatus generally includes a memory and at least one processor coupled with memory. The processor and memory are configured to configure one or more UEs of a group of UEs with a configuration of one or more resources. The one or more resources includes one or more sidelink channels between each of the UEs in the group of UEs and an uplink channel between the apparatus and each of the UEs in the group of UEs. The processor and memory are configured to receive data from at least one UE in the group of UEs via at least one of the uplink channels, wherein the data is associated with a different UE.

One or more aspects of the subject matter described in this disclosure can be implemented in a first apparatus for wireless communications. The first apparatus generally includes a memory and at least one processor coupled with memory. The processor and memory are configured to receive a configuration of one or more resources for a group of apparatus including a first apparatus. The one or more resources includes one or more sidelink channels between the first apparatus and a second apparatus and an uplink channel between the first apparatus and a BS. The processor and memory are configured to transmit data to the BS and the second apparatus using at least one of the one or more resources.

One or more aspects of the subject matter described in this disclosure can be implemented in a second apparatus for wireless communications. The second apparatus generally includes a memory and at least one processor coupled with memory. The processor and memory are configured to receive a configuration of one or more resources for a group of apparatuses including a second apparatus. The one or more resources includes one or more sidelink channels between the second apparatus and a first apparatus and an uplink channel between the second apparatus and a BS. The processor and memory are also configured to receive data from the first apparatus via one of the one or more sidelink channels. The processor and memory are configured to retransmit the data to the BS.

One or more aspects of the subject matter described in this disclosure can be implemented in an apparatus for wireless communications. The apparatus generally includes means for configuring one or more UEs of a group of UEs with a configuration of one or more resources. The one or more resources includes one or more sidelink channels between each of the UEs in the group of UEs and an uplink channel between the apparatus and each of the UEs in the group of UEs. The apparatus includes means for receiving data from at least one UE in the group of UEs via at least one of the uplink channels, wherein the data is associated with a different UE.

One or more aspects of the subject matter described in this disclosure can be implemented in a first apparatus for wireless communications. The first apparatus generally includes means for receiving a configuration of one or more resources for a group of apparatuses including the first apparatus. The one or more resources includes one or more sidelink channels between the first apparatus and a second apparatus and an uplink channel between the first apparatus and a BS. The first apparatus includes means for transmitting data to the BS and the second apparatus using at least one of the one or more resources.

One or more aspects of the subject matter described in this disclosure can be implemented in a second apparatus for wireless communications. The second apparatus generally includes means for receiving a configuration of one or more resources for a group of apparatuses including the second apparatus. The one or more resources includes one or more sidelink channels between the second apparatus and a first apparatus and an uplink channel between the second apparatus and a BS. The second apparatus includes means for receiving data from the first apparatus via one of the one or more sidelink channels. The second apparatus includes means for retransmitting the data to the BS.

One or more aspects of the subject matter described in this disclosure can be implemented in a computer readable medium storing computer executable code thereon for wireless communications. The computer readable medium generally includes code for configuring one or more UEs of a group of UEs with a configuration of one or more resources. the one or more resources includes one or more sidelink channels between each of the UEs in the group of UEs and an uplink channel between a BS and each of the UEs in the group of UEs. The computer readable medium includes code for receiving data from at least one UE in the group of UEs via at least one of the uplink channels, wherein the data is associated with a different UE.

One or more aspects of the subject matter described in this disclosure can be implemented in a computer readable medium storing computer executable code thereon for wireless communications. The computer readable medium generally includes code for receiving a configuration of one or more resources for a group of UEs including a first UE. The one or more resources includes one or more sidelink channels between the first UE and a second UE and an uplink channel between the first UE and a BS. The computer readable medium includes code for transmitting data to the BS and the second UE using at least one of the one or more resources.

One or more aspects of the subject matter described in this disclosure can be implemented in a computer readable medium storing computer executable code thereon for wireless communications. The computer readable medium generally includes code for receiving a configuration of one or more resources for a group of UEs including a second UE. The one or more resources includes one or more sidelink channels between the second UE and a first UE and an uplink channel between the second UE and a BS. The computer readable medium includes code for receiving data from the first UE via one of the one or more sidelink channels. The computer readable medium includes code for retransmitting the data to the BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
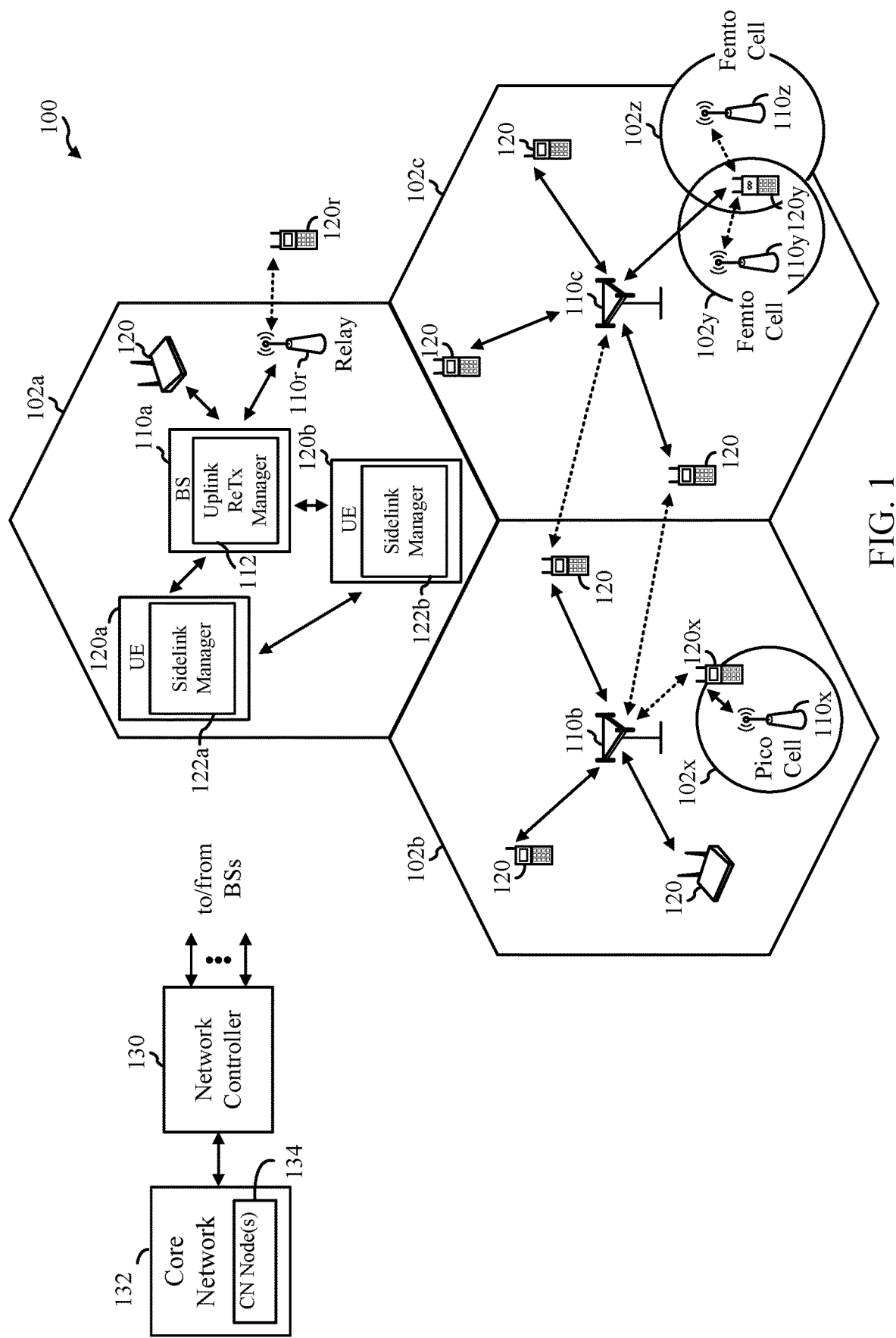
FIG. 1 is a block diagram conceptually illustrating an example telecommunications system, in accordance with certain aspects of the present disclosure.

Aspects of the present disclosure provide apparatus, methods, processing systems, and computer readable mediums for sending an uplink transmission through sidelinks.

Certain systems employ sidelink communications between devices, such as between user equipments (UEs). In general, sidelink communications may include communications between two or more subordinate wireless communication devices (e.g., UEs) in a wireless communication network, without the two or more subordinate wireless communication devices needing to communicate via another network entity (e.g., a base station (BS)). Accordingly, sidelink communication may enable low latency communications, path diversity, and extended coverage in a wireless communication network.

In some cases, uplink transmissions from a UE to a BS can become blocked, which may cause radio link failure, beam failure and/or transmission failure. Aspects of the present disclosure provide techniques and apparatus for communicating uplink transmissions through sidelinks, such as to provide a communication path between a UE and a BS via another UE, even when the direct uplink between the UE and the BS is blocked.

In certain aspects, a first UE (e.g., an "originating" UE) may send (e.g., broadcast/multicast) an uplink transmission to the BS and to at least a nearby second UE (e.g., a "helper" UE) of a group of UEs. The second UE may listen to the uplink transmission using sidelink communication channels and store the uplink transmission. The BS may trigger the second UE to retransmit the uplink transmission to the BS if or when the transmission from the first UE to the BS fails. In one or more aspects, the first and second UEs may be configured with semi-persistent scheduling (SPS) resources for the uplink and sidelink transmissions. In one or more aspects, the uplink retransmission may be triggered by a group physical downlink control channel (PDCCH) transmission.

The following description provides examples of uplink transmissions through sidelinks for multi-path diversity, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

NR access (for example, 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or user equipment (UE) 120 in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110. The network controller 130 may communicate with the BSs 110 via a backhaul.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for uplink transmissions through sidelinks. As shown in FIG. 1, the BS 110a includes an uplink retransmission (ReTx) manager 112. The uplink retransmission manager 112 may configure the UE 120a and UE 120b with resources, which include one or more sidelink channels between UE 120a and 120b and an uplink channel between UEs 120a, 120b and the BS 110a, and which may be a group SPS resource, in accordance with one or more aspects of the disclosure. As shown in FIG. 1, the UE 120a includes a sidelink manager 122a. The sidelink manager 122a may be configured to receive the configuration of one or more resources and to transmit data to the BS 110a and the UE 120b using the one or more resources, in accordance with one or more aspects of the disclosure. As shown in FIG. 1, the UE 120b includes a sidelink manager 122b. The sidelink manager 122b may be configured to receive the configuration of one or more resources, receive the data from the UE 120a via one of the sidelink channels, and to retransmit the data to the BS 110a.

Figure 2:
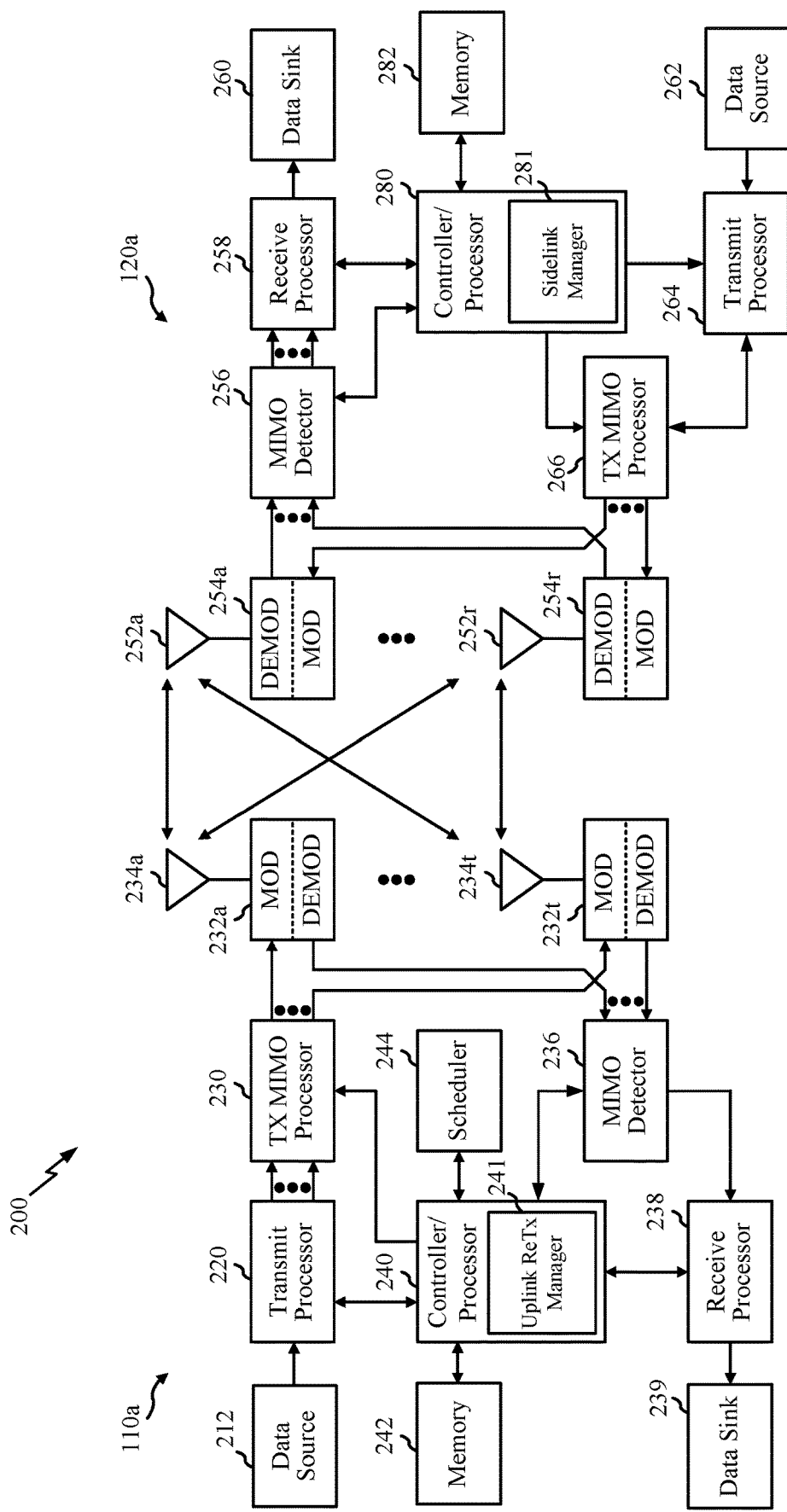
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, the BS 110a may transmit a MAC-CE to a UE 120a to put the UE 120a into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel (PSSCH). A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a or sidelink signals from a sidelink UE (e.g., such as the UE 120b) and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink or sidelink, at UE 120a, a transmit processor 264 may receive and process data (e.g., for the physical uplink shared channel (PUSCH) or the physical sidelink shared channel (PSSCH)) from a data source 262 and control information (e.g., for the physical uplink control channel (PUCCH) or physical sidelink control channel (PSCCH)) from the controller/processor 280. The transmit processor 264 may also generate reference symbols for a reference signal (e.g., for the sounding reference signal (SRS) or channel state information reference signal (CSI-RS)). The symbols from the transmit processor 264 may be precoded by a TX MIMO processor 266 if applicable, further processed by the modulators in transceivers 254a-254r (e.g., for SC-FDM, etc.), and transmitted to the BS 110a (or the sidelink UE 120c). At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a-120b, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 240 of the BS 110a has an uplink retransmission (ReTx) manager 241 that may be configured for path diversity using sidelinks for uplink transmission, according to aspects described herein. As shown in FIG. 2, the controller/processor 280 of the UE 120a has a sidelink manager 281 that may be configured for path diversity using sidelink for uplink transmission, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 subcarriers. The system bandwidth may also be partitioned into subbands. For example, a subband may cover multiple RBs. NR may support a base subcarrier spacing (SCS) of 15 KHz and other subcarrier spacing may be defined with respect to the base SCS, for example, 30 kHz, 60 kHz, 120 kHz, 240 kHz, etc. In NR, a subframe is 1 ms, but the basic TTI is referred to as a slot. A subframe contains a variable number of slots (e.g., 1, 2, 4, 8, 16, . . . slots) depending on the SCS. The symbol, slot, and CP lengths scale with the SCS.

Figure 3:
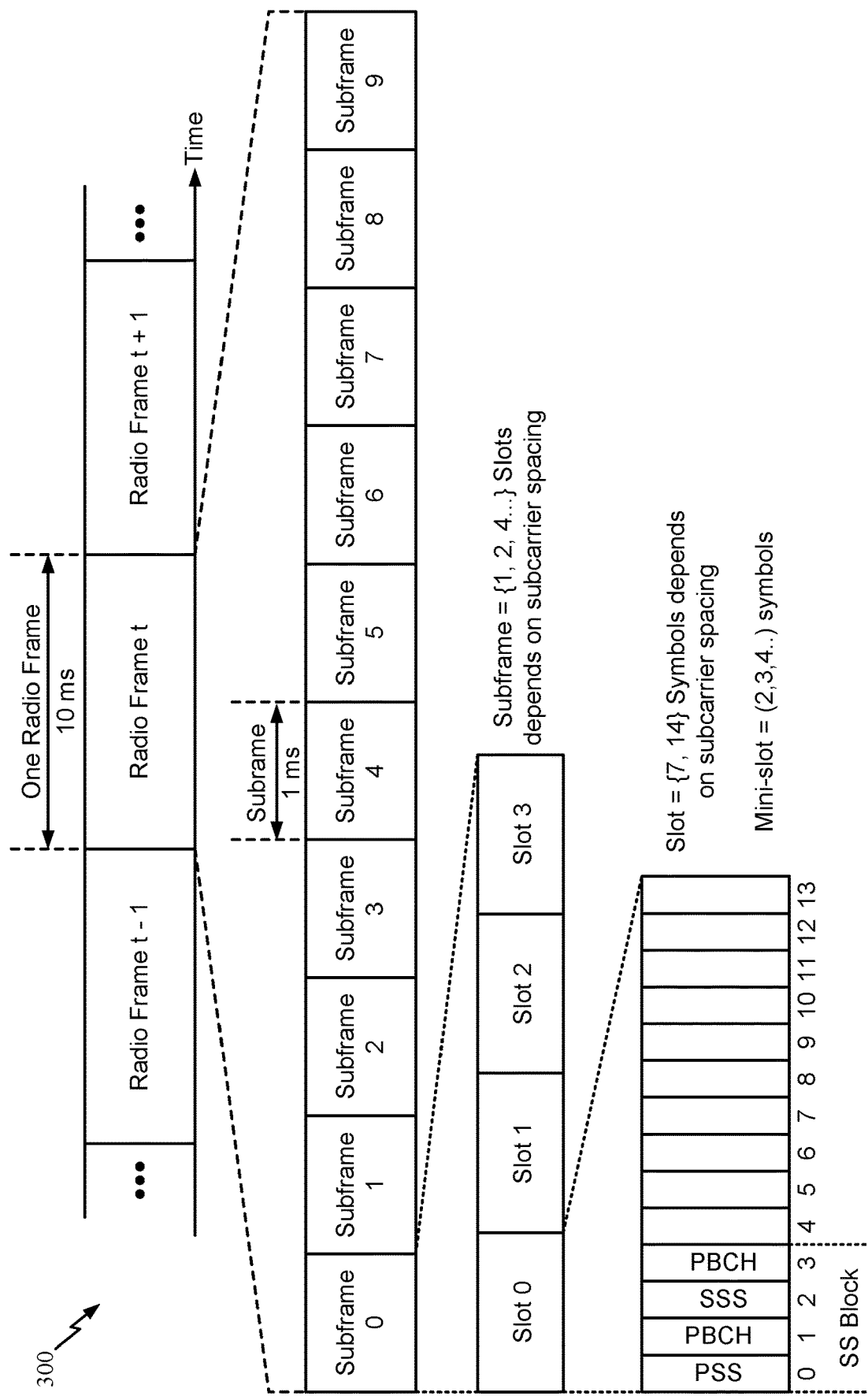
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link (or direct link). The access link may be provided via a Uu interface. Communication between UEs may be referred to as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., UE 120b) without relaying that communication through the scheduling entity (e.g., another UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state feedback (CSF) related to a sidelink channel quality.

In some cases, sidelinks may be used in industrial Internet-of-Things (IIoT) systems. IIOT wireless devices may enable machines to tell operators how to optimize productivity or detect a failure before it occurs, thereby saving costs to companies. Use of sidelink in IIOT may reduce latency, provide multi-path diversity, extend coverage, improve battery-lifetime, provide location enhancement, and enable infrastructure-less communication.

Figure 4:
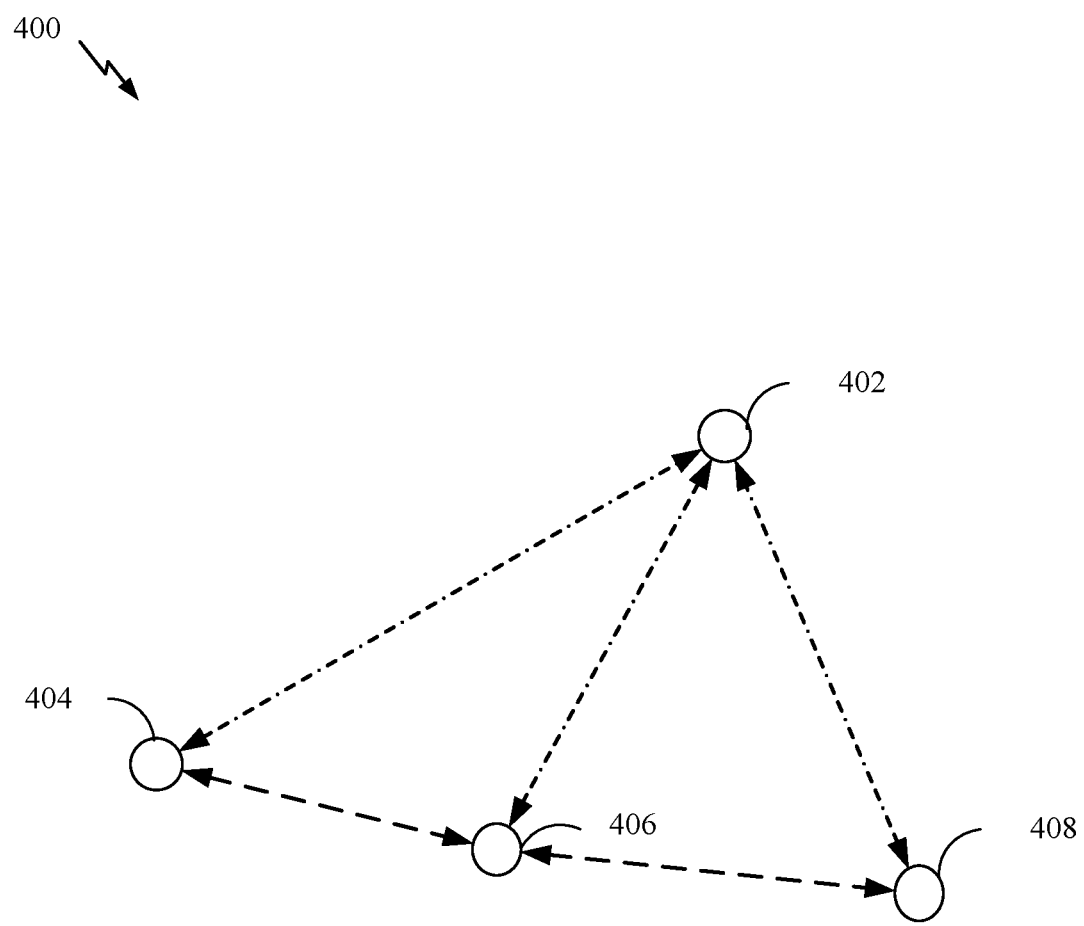
FIG. 4 is a diagram showing example access links and sidelink links, in accordance with certain aspects of the present disclosure.
Figure 5:
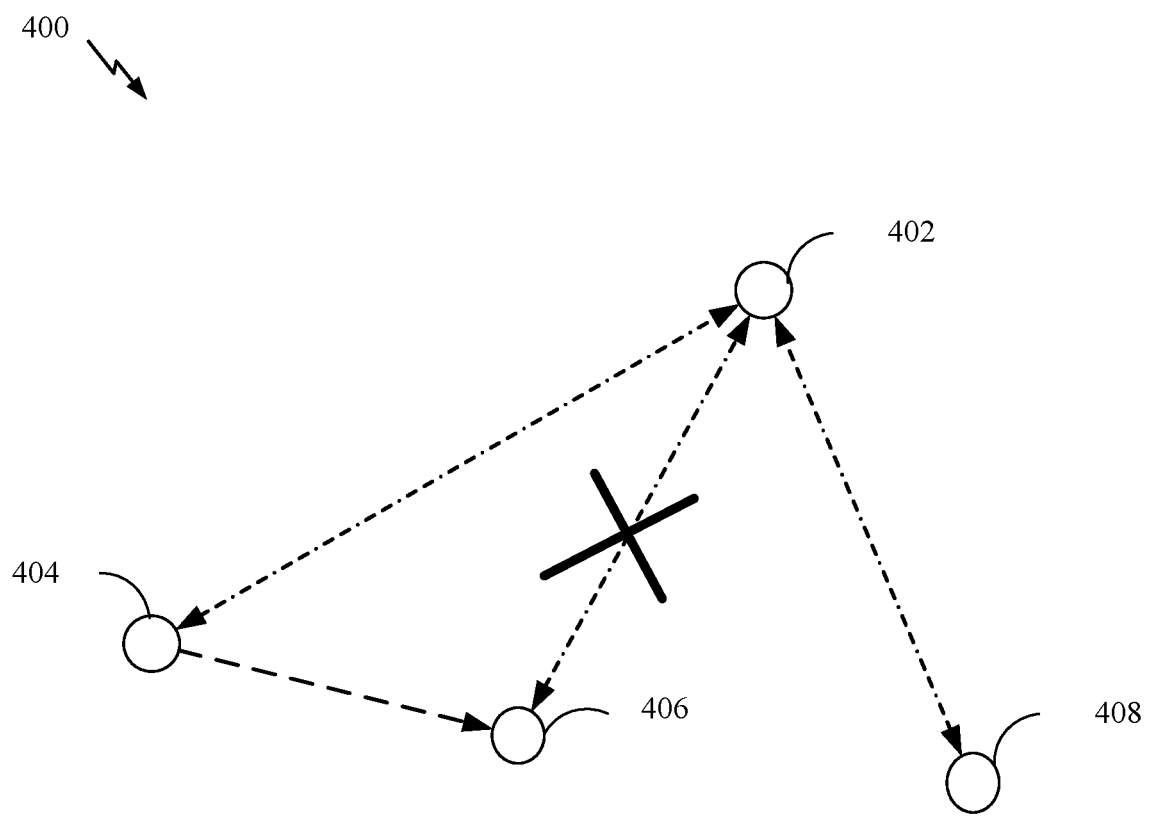
FIG. 5 is a diagram showing an example blocked access link, in accordance with certain aspects of the present disclosure.
Figure 6:
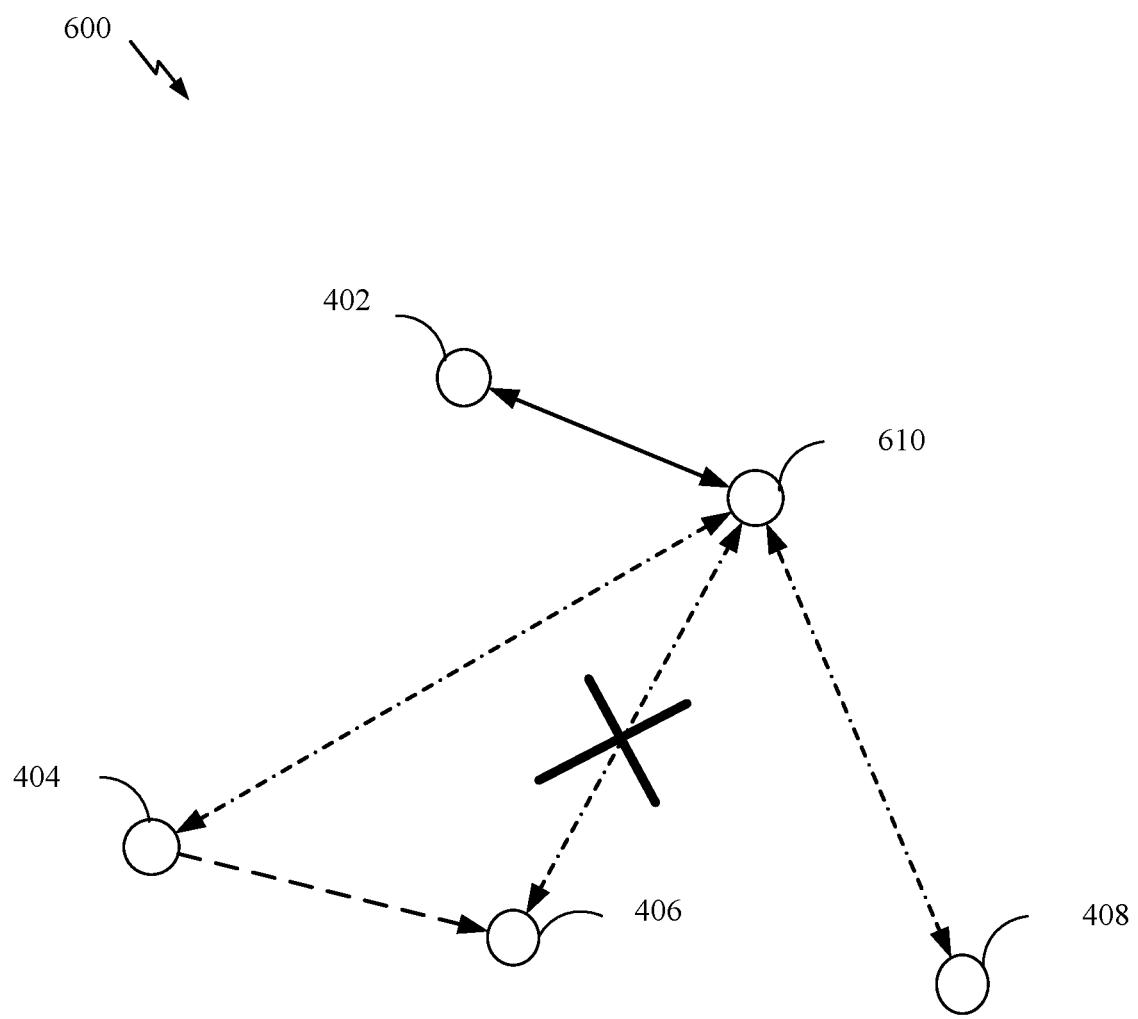
FIG. 6 is a diagram showing an example blocked sidelink, in accordance with certain aspects of the present disclosure.

FIGS. 4, 5, and 6 are diagrams showing example access links and sidelink links, in accordance with certain aspects of the present disclosure. As shown in FIG. 4, an IIOT system 400 may include a gNB 402 and sidelink devices 404, 406, 408 (which may be UEs). The gNB 402 communicates with the sidelink devices 404, 406, 408 via direct links and the sidelink devices 404, 406, 408 communicate with each other via sidelinks. In some cases, however, a direct link between the gNB 402 and a sidelink device 406 may be blocked, as shown in FIG. 5. In some cases, a programmable logical controller (PLC) may be used. For example, gNB 402 in the IIOT system 600 communicates with a PLC 610 via a direct link and the PLC 610 communicates with the sidelink devices 404, 406, 408 via sidelinks, as shown in FIG. 6.

To increase path diversity, sidelink devices in the system (e.g., referred to herein as helper UEs) may retransmit the uplink transmission from another sidelink device (e.g., referred to herein as an originating UE) that has a blocked link with the gNB or PLC.

In some cases, the sidelink devices can perform sidelink channel signal quality measurements, such as reference signal receive power (RSRP) measurements, of pilot signals. The sidelink devices can report the sidelink channel measurements to the gNB. Based on the reported measurements, the gNB schedules the sidelink devices. For example, the gNB can select the helper UEs and originating UEs.

Example Multi-Path Diversity for Uplink Transmissions Through Sidelinks

Aspects of the present disclosure provide uplink transmissions through sidelinks for path diversity. As mentioned above, sidelinks may be configured in industrial Internet-of-Thing (IIoT) systems. In IIoT, the traffic may be periodic and the traffic arrival times may be known. Thus, certain aspects provide techniques for group semi-persistent scheduling (SPS) resources for sidelink and uplink transmissions. According to certain aspects, a first user equipment (UE) (e.g., originating UE 120a) may be configured to send data to a base station (e.g., BS 110a) via an uplink channel and to one or more other UEs (e.g., a helper UE 120b) in a group of UEs via a sidelink channel. The other UEs may be configured to store the data from the first UE and to retransmit the data to the BS via an uplink channel. For example, if the BS detects that the uplink data transmission from the first UE failed, then the BS may send an indication to the group of UEs to schedule the retransmission of the uplink transmission from one of the other UEs of the group of UEs. In some examples, the indication may be sent as a group physical downlink control channel (PDCCH) message. The group PDCCH may include one or more control messages for uplink retransmission.

Figure 7:
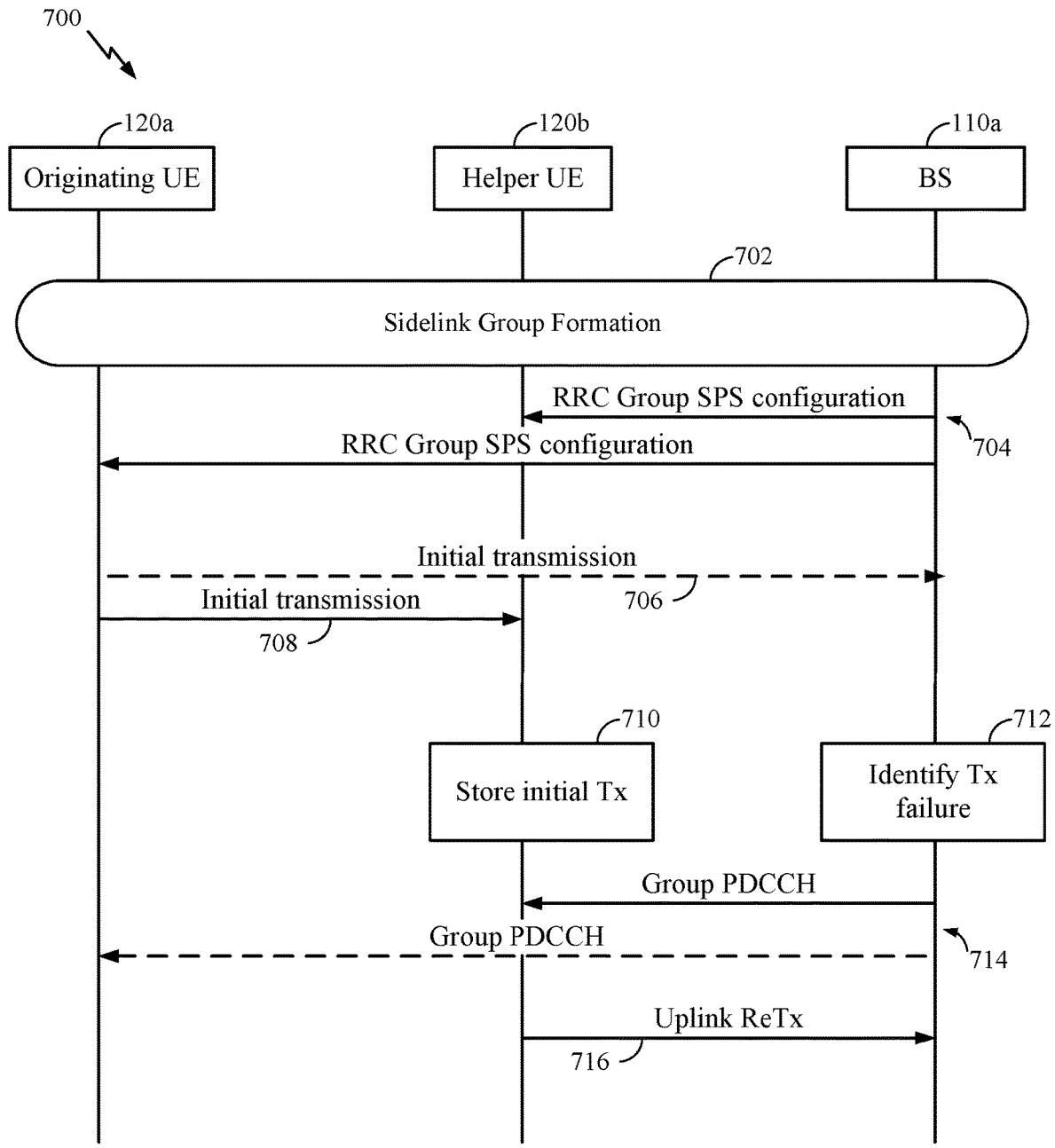
FIG. 7 is a call flow diagram illustrating example signaling for uplink transmissions through sidelinks for path diversity, in accordance with aspects of the present disclosure.

FIG. 7 is a call flow diagram illustrating example operations 700 for uplink transmissions through sidelinks for path diversity. Although FIG. 7 shows a BS 110a, the operations may also be performed by a programmable logic controller (PLC), for example, in communication with the BS 110a via an uplink channel and in communications with the UEs via sidelink channels. As shown in FIG. 7, at 702, one or more sidelink groups may be formed, each group including one or more "helper" UEs 120b and one or more "originating" UEs 120a. Each helper UE 120b is configured to retransmit data to the BS 110a from one or more originating UEs 120a, as further described herein. In some examples, the BS 110a may configure the sidelink group. For example, the UEs 120a, 120b may exchange a reference signal (e.g., sidelink channel state information reference signals (CSI-RSs)) and can measure the channel quality and report the measurements to the BS 110a. Based on the reported measurements, the BS 110a may form the sidelink groups.

At 704, the BS 110a may configure one or more UEs (e.g., UEs 120a, 120b) of the sidelink group with a configuration of one or more resources. The one or more resources include one or more sidelink channels between each of the UEs 120a and 120b in the sidelink group and an uplink channel between the BS 110a and each of the UEs 120a and 120b in the sidelink group. In some examples, the one or more resources includes one or more group SPS resources. For example, the BS 110a may use configured grants (CG) to transmit (e.g., via radio resource control (RRC)) SPS scheduling. The one or more SPS resources may configure the originating UE 120a in the sidelink group to transmit (e.g., broadcast and/or multicast transmissions) data to the helper UE 120b (via a sidelink channel) and the BS 110a (via an uplink channel). Thus, the helper UE 120b may be configured to periodically listen to the originating UE 120a in the sidelink group.

According to certain aspects, the BS 110a further configures a group ID (or group IDs) associated with the common SPS resource. The group ID may be used to activate the common SPS resource for the associated group or groups of UEs. In some examples, each group ID may be associated with an originating UE (e.g., originating UE 120a). Although not shown in FIG. 7, the BS may activate (e.g., or release) an SPS resource (or resources) using a common downlink control information (DCI). The BS 110a may send DCI to the originating UE 120a to active the uplink channel with the BS 110a and the sidelink channel with the helper UE 120b. In some examples, the group ID may be a Group-SPS-RNTI (radio network temporary identifier). In some examples, at 604, the BS 110a may configure (e.g., via RRC) the helper UE IDs and the originating UE IDs in addition to the group ID associated with the common SPS resource.

At 706, the originating UE 120a sends an uplink transmission to the BS 110a. For example, the originating UE 120a may transmit data to the BS 110a via an uplink channel using an activated SPS resource.

At 708, the originating UE 120a sends a sidelink transmission to the sidelink group including the helper UE 120b. For example, the originating UE 120a may send the same data to the helper UE 120b via a sidelink channel using an activated SPS as the uplink transmission to the BS 110a at 706. In some examples, the originating UE 120a may transmit the data concurrently to the BS 110a and the helper UE 120b. In some examples, the originating UE 120a may transmit the data to the helper UE 120b after transmitting the data to the BS 110a.

At 710, the helper UE 120b may store the initial transmission (e.g., the data), sent via the sidelink from the originating UE 120a (at 708), in a buffer. In some examples, the buffer may be a separate hybrid automatic repeat request (HARD) buffer dedicated for sidelink transmissions for later retransmission to the BS 110a. The helper UE 120b may have information about the originating UE associated with the stored data transmission (e.g., obtained by inspecting the SPS configuration).

At 712, the BS 110a may identify that there was a transmission failure. In some examples, the BS 110a may identify that the transmissions from the originating UE 120a were not received. For example, the BS 110a may monitor the activated SPS resource for a transmission from the originating UE 120a. After a certain time in which the BS 110a has not received an uplink transmission from the originating UE 120a, the BS 110a may assume that something prevented the BS 110a from receiving the uplink transmission.

Based on identifying the transmission failure, the BS 110a may signal to the helper UE 120b to retransmit the data from the originating UE 120a to the BS 110a. For example, at 714, the BS 110a may transmit a group PDCCH message (e.g., including a DCI) indicating for the helper UE 120b to retransmit at least a portion of the uplink transmission from the originating UE 120a (e.g., the transmission received at 608 and stored in the buffer at 710). As shown in FIG. 7, the group PDCCH may be transmitted to both the helper UE 120b and the originating UE 120a in the group; however, the group PDCCH may not be received at the originating UE 120a (e.g., when the link is blocked). The group PDCCH may include a UE ID (e.g., a UE specific RNTI such as the Cell RNTI (C-RNTI)) of the helper UE 120b.

In some examples, each group PDCCH message may include multiple control messages scrambled with a cyclic redundancy check (CRC) scrambled with an RNTI that allows the UEs in the sidelink group to decode the group PDCCH message. A group RNTI associated with a sidelink group may be referred to herein as a group of sidelinks RNTI (G-SL-RNTI). For example, the sidelink group may be configured with a G-SL-RNTI that facilitates broadcast/multicast transmissions to the sidelink group. Each control message in the group PDCCH message may indicate various parameters including a UE identifier (ID) of the helper UE (e.g., helper UE 120b) that retransmits the uplink transmission. The parameters may also include a resource allocation indicating the resources for the uplink retransmission, a modulation and coding scheme (MCS) for the uplink retransmission, a redundancy version (RV) for the uplink retransmission, a power control command for the uplink retransmission, and/or a HARQ process number associated with the retransmission.

As described, each group of UEs (e.g., associated with a G-SL-RNTI) may be associated with an originating UE and each control message in the group PDCCH may include a UE ID of one or more helper UEs in the group for the originating UE. Thus, the combination of a G-SL-RNTI and the UE ID in the group PDCCH message may uniquely determine the originating UE 120a and the helper UE 120b associated with the retransmission. The BS 110a may use the G-SL-RNTI to configure the group PDCCH control messages used for the uplink retransmission performed by the helper UE(s) 120b for the originating UE 120a associated with the group identified by the G-SL-RNTI and the BS 110a may use the UE ID in the group PDCCH to specify the helper UE 120b within the group of UEs associated with the G-SL-RNTI to perform the retransmission.

At 716, the helper UE 120b retransmits the data to the BS 110a. For example, based on the group PDCCH received at 714, the helper UE 120b may retransmit the initial data transmission, received at 708 from the originating UE 120a and stored in the buffer at 710, to the BS 110a. The helper UE 120b may identify the data scheduled for retransmission based on the group PDCCH message (e.g., the G-SL-RNTI associated with the originating UE 120a), retrieve that data from the buffer, and retransmit to the BS 110a via an uplink channel.

According to certain aspects, the configured common SPS resource(s) may be updated (or reconfigured). In some examples, when the resource allocation for the SPS is changed, the BS 110a may indicate the change in the DCI that is used for SPS activation (or release). In some examples, the BS 110a may also indicate, for example in the DCI, whether the UEs 120a, 120b are requested to acknowledge the SPS resource change. The BS 110a may configure the resource used for the acknowledgment, for example, during the RRC configuring the initial SPS resource allocation at 704. Thus, the UEs 120a, 120b may monitor DCI for the activation (or release) as well as for SPS resource change.

Figure 8:
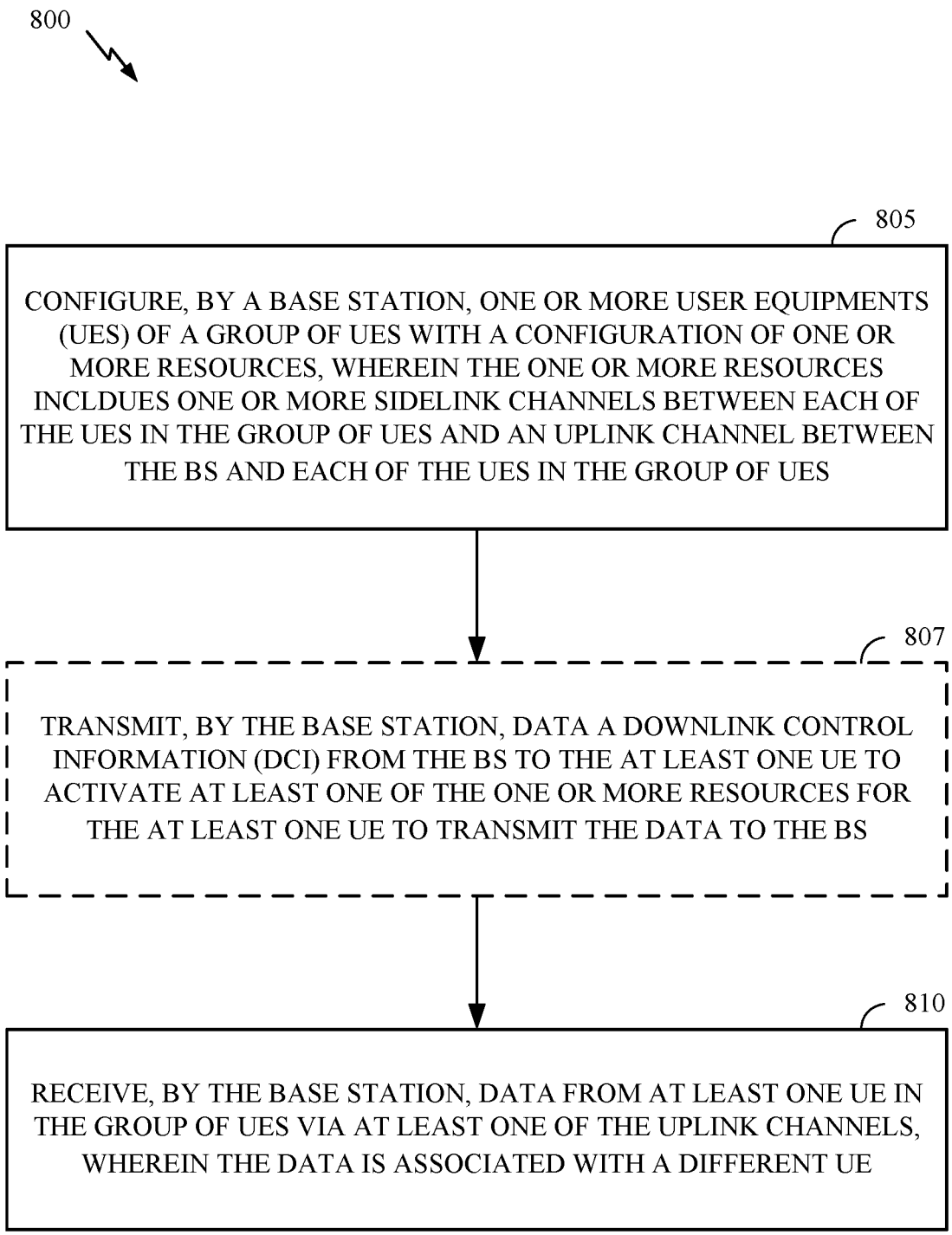
FIG. 8 is a flow diagram illustrating example operations for wireless communication by a node, in accordance with certain aspects of the present disclosure.

FIG. 8 is a flow diagram illustrating example operations 800 for wireless communication, in accordance with certain aspects of the present disclosure. The operations 800 may be performed, for example, by a node, such as a BS (e.g., the BS 110a in the wireless communication network 100) or a PLC (not shown). The operations 800 may be complimentary operations by the node to the operations 900 and/or 1000 performed by a UE. Operations 800 may be implemented as software components that are executed and run on one or more processors (e.g., controller/processor 240 of FIG. 2). Further, the transmission and reception of signals by the node in operations 800 may be enabled, for example, by one or more antennas (e.g., antennas 234 of FIG. 2). In certain aspects, the transmission and/or reception of signals by the node may be implemented via a bus interface of one or more processors (e.g., controller/processor 240) obtaining and/or outputting signals.

The operations 800 may begin, at 805, by configuring (e.g., via RRC signaling) one or more UEs of a group of a UEs with a configuration of one or more resources. The one or more resources include one or more sidelink channels between each of the UEs in the group of UEs and an uplink channel between the BS and each of the UEs in the group of UEs. In some examples, the one or more resources may include one or more SPS resources. The one or more resources may be configured with one or more associated group IDs of one or more groups of UEs. Each group may be configured with a group ID associated with an originating UE.

In some examples, optionally, at 807, the node may send a downlink control information (DCI) to activate one of the SPS resources for at least one UE of the group of UEs for the at least one UE to transmit data (e.g., an initial uplink transmission) to the BS. In some examples, the node may send a DCI including an indication of an updated SPS resource. The DCI may include a request for the group of UEs to acknowledge the updated SPS resource. In some examples, the node may send a further DCI to release the SPS resource.

At 810, the node receives data from at least one UE in the group of UEs via at least one of the uplink channels. The data is associated with a different UE than the at least one UE.

In some examples, the node may monitor one of the one or more resources for uplink data from a first UE (e.g., originating UE) of the group of UEs, and may transmit an indication (e.g., a group PDCCH message) to a second UE (e.g., helper UE) to retransmit the uplink data from the first UE when the uplink data from the first UE was not received. In some examples, the node may send a group PDCCH message including a CRC scrambled with a G-SL-RNTI associated with the first UE (e.g., an originating UE). In some examples, the group PDCCH may include one or more control messages where each control message may include a UE ID that specifies a helper UE. Each control message inside the group PDCCH message may include a resource allocation for retransmitting the uplink data, an MCS for retransmitting the uplink data, an RV for retransmitting the uplink data, a power control command for retransmitting the uplink data, or a combination thereof.

Figure 9:
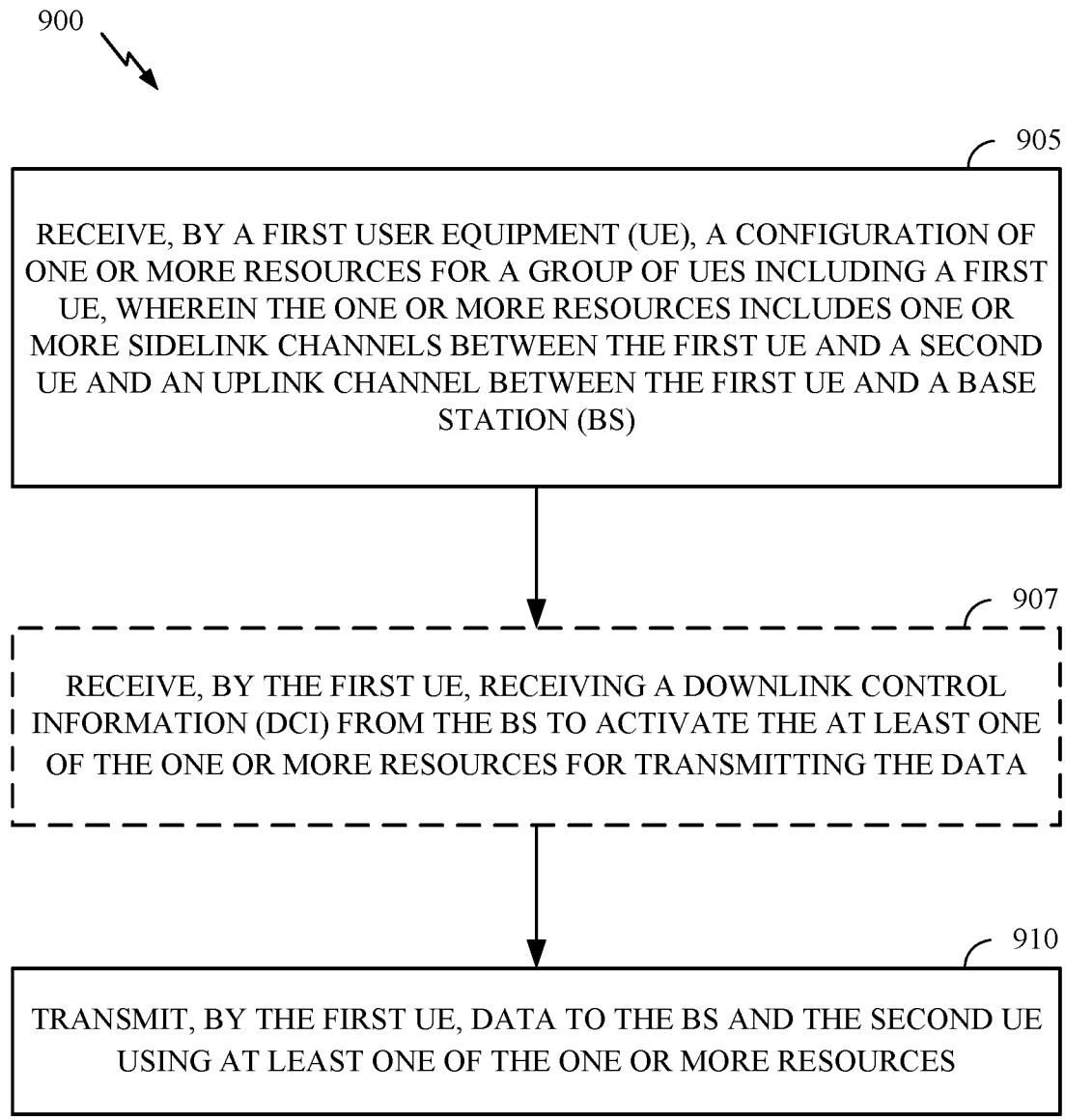
FIG. 9 is a flow diagram illustrating example operations for wireless communication by an originating UE, in accordance with certain aspects of the present disclosure.

FIG. 9 is a flow diagram illustrating example operations 900 for wireless communication, in accordance with certain aspects of the present disclosure. The operations 900 may be performed, for example, by a first UE (e.g., such as a UE 120a in the wireless communication network 100), which may be an originating UE. The operations 900 may be complimentary operations by the UE to the operations 800 performed by the node and/or the operations 1000 performed by the second UE. Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at 905, by receiving a configuration of one or more resources for a group of UEs including the first UE (e.g., an originating UE). The resources include one or more sidelink channels between the first UE and a second UE and an uplink channel between the first UE and a BS. In some examples, the one or more resources may be one or more SPS resources. The one or more resources may be associated with one or more group IDs of one or more groups of UEs as indicated in the configuration. For example, each group may be configured with a group ID associated with an originating UE, including the first UE.

In some examples, optionally, at 907, the first UE receives a DCI from a node to activate the one or more resources for transmitting data (e.g., uplink data and sidelink data). In some examples, the first UE may receive a DCI including an indication of an updated SPS resource. The DCI may further includes a request for the UE to acknowledge the updated SPS resource. In some examples, the first UE may further receive a DCI to release the SPS resource.

At 910, the first UE transmits data to the BS and the second UE using at least one of the one or more resources. In certain aspects, the first UE may broadcast/multicast the data to the BS and to the second UE using an omnidirectional signal as a broadcast. The first UE may transmit the data to the BS using a first beam on the uplink channel and transmit the data to the second UE using a second beam. In some examples, the first UE may transmit the data to the second UE at a different time than transmitting the data to the BS.

Figure 10:
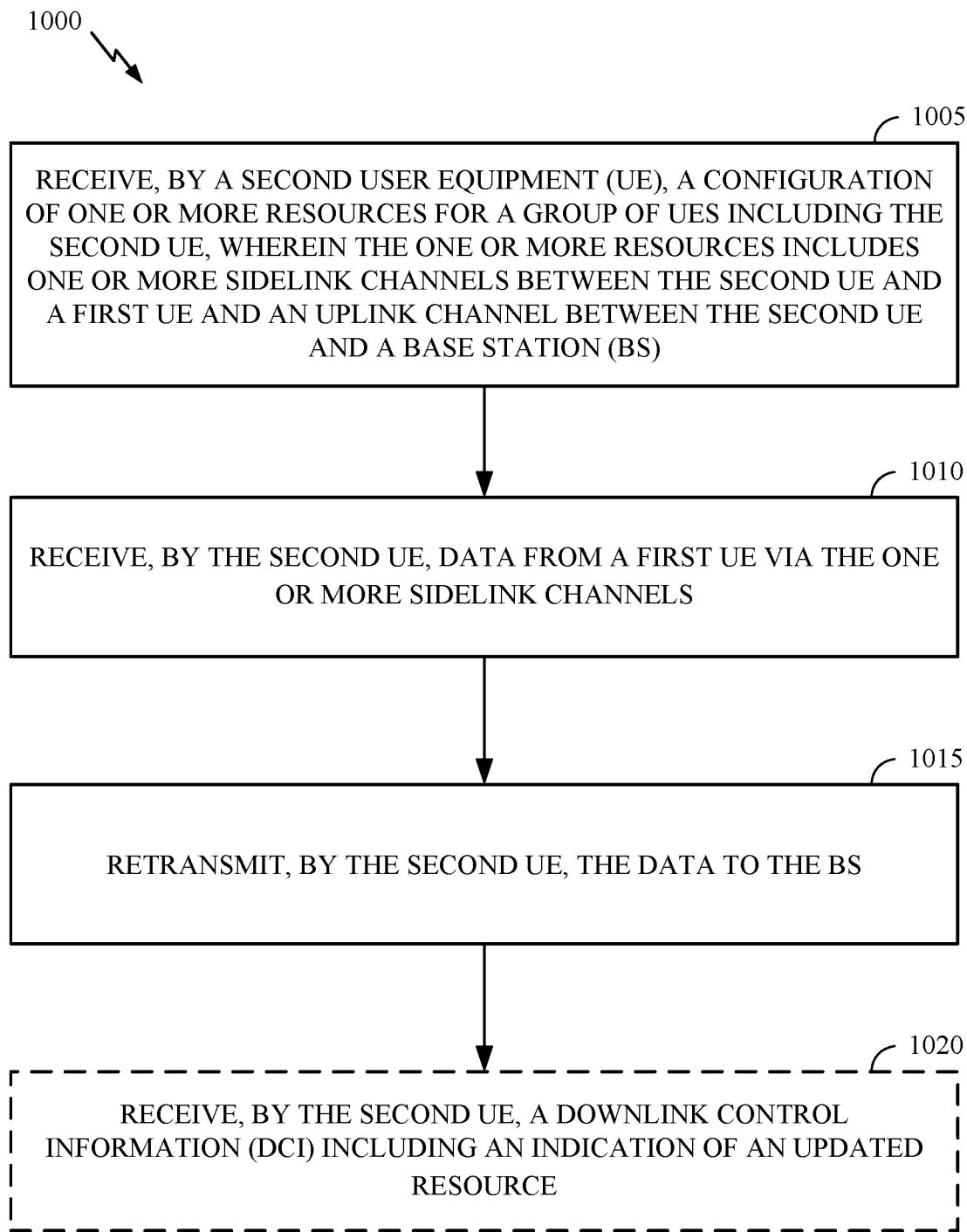
FIG. 10 is a flow diagram illustrating example operations for wireless communication by a helper UE, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., such as a UE 120*b* in the wireless communication network 100), which may be a helper UE. The operations 900 may be complimentary operations by the UE to the operations 800 performed by the node and/or the operations 900 performed by the helper UE. Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at 1005, by receiving a configuration of one or more resources for a group of UEs including the second UE (e.g., helper UE). The one or more resources include one or more sidelink channels between the second UE and a first UE (e.g., the originating UE) and an uplink channel between the second UE and a BS. In some examples, the second UE may receive a configuration for one or more SPS resources as described above.

At 1010, the second UE receives data from the first UE via one of the one or more sidelink channels.

At 1015, the second UE retransmits the data to the BS (e.g., using the uplink channel between the second UE and the BS). In some examples, the second UE may store the data received from the first UE, and may receive an indication from the BS to retransmit the data and retransmits the stored data in response to receiving the indication from the BS. In some examples, the indication may be a group PDCCH message including a CRC scrambled with a G-SL-RNTI associated with the first UE. In some examples, the group PDCCH may include one or more control messages where each control message may include a UE ID that specifies a helper UE. Each control messages inside the group PDCCH message may include a resource allocation for retransmitting the uplink data, an MCS for retransmitting the uplink data, an RV for retransmitting the uplink data, a power control command for retransmitting the uplink data, or a combination thereof. In some examples, the second UE may receive one or more DCI as described above to activate, release, and/or update (e.g., optionally, at 1020) one or more SPS resources.

Figure 11:
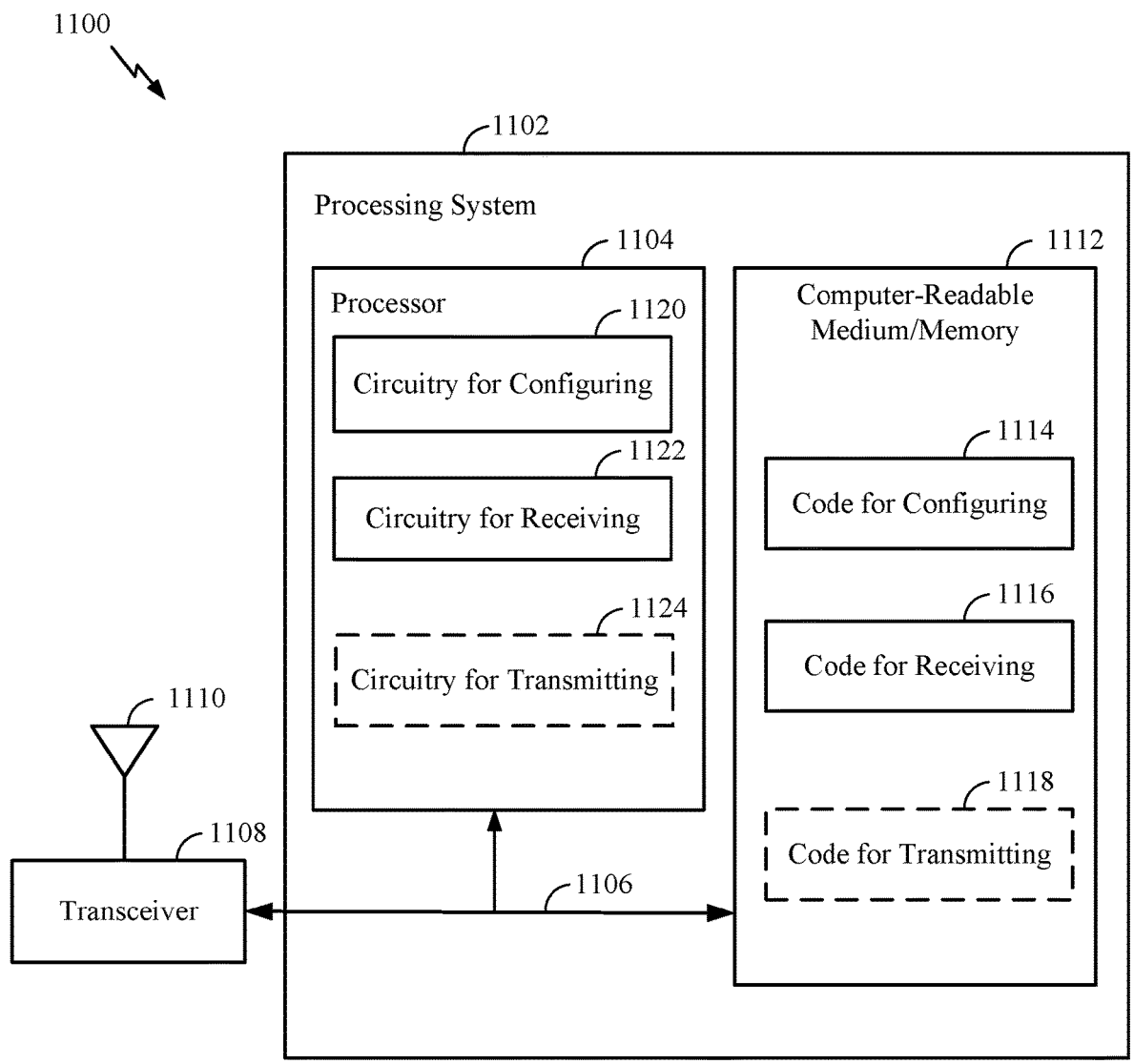
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for uplink transmission through sidelink for path diversity. In certain aspects, computer-readable medium/memory 1112 stores code 1114 for configuring one or more UEs of a group of UEs with a configuration of one or more resources, wherein the one or more resources includes one or more sidelink channels between each of the UEs in the group of UEs and an uplink channel between the BS and each of the UEs in the group of UEs; and code 1116 for receiving data from at least one UE in the group of UEs via at least one of the uplink channels, wherein the data is associated with a different UE, in accordance with aspects of the present disclosure. In certain aspects, the computer-readable medium/memory 1112 may store code 1118 for transmitting a DCI from the BS to the at least one UE to activate at least one of the one or more resources for the at least one UE to transmit the data to the BS. In certain aspects, the processor 1104 has circuitry configured to implement the code stored in the computer-readable medium/memory 1112. The processor 1104 includes circuitry 1120 for configuring one or more UEs of a group of UEs with a configuration of one or more resources, wherein the one or more resources includes one or more sidelink channels between each of the UEs in the group of UEs and an uplink channel between the BS and each of the UEs in the group of UEs; and circuitry 1122 for receiving data from at least one UE in the group of UEs via at least one of the uplink channels, wherein the data is associated with a different UE, in accordance with aspects of the present disclosure. In certain aspects, the processor 1104 may include circuitry 1124 for transmitting a DCI from the BS to the at least one UE to activate at least one of the one or more resources for the at least one UE to transmit the data to the BS.

For example, means for transmitting (or means for outputting for transmission) may include a transmitter and/or an antenna(s) 234 or the BS 110*a* or the transmitter unit 254 illustrated in FIG. 2 and/or circuitry1124 of the communication device 1100 in FIG. 11. Means for receiving (or means for obtaining) may include a receiver and/or an antenna(s) 234 of the BS 110a illustrated in FIG. 2 and/or circuitry 1122 of the communication device 1100 in FIG. 11. Means for communicating may include a transmitter, a receiver or both. Means for generating, means for configuring means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a illustrated in FIG. 2 and/or the processing system 1102 of the communication device 1100, including circuitry 1120, in FIG. 11.

Figure 12:
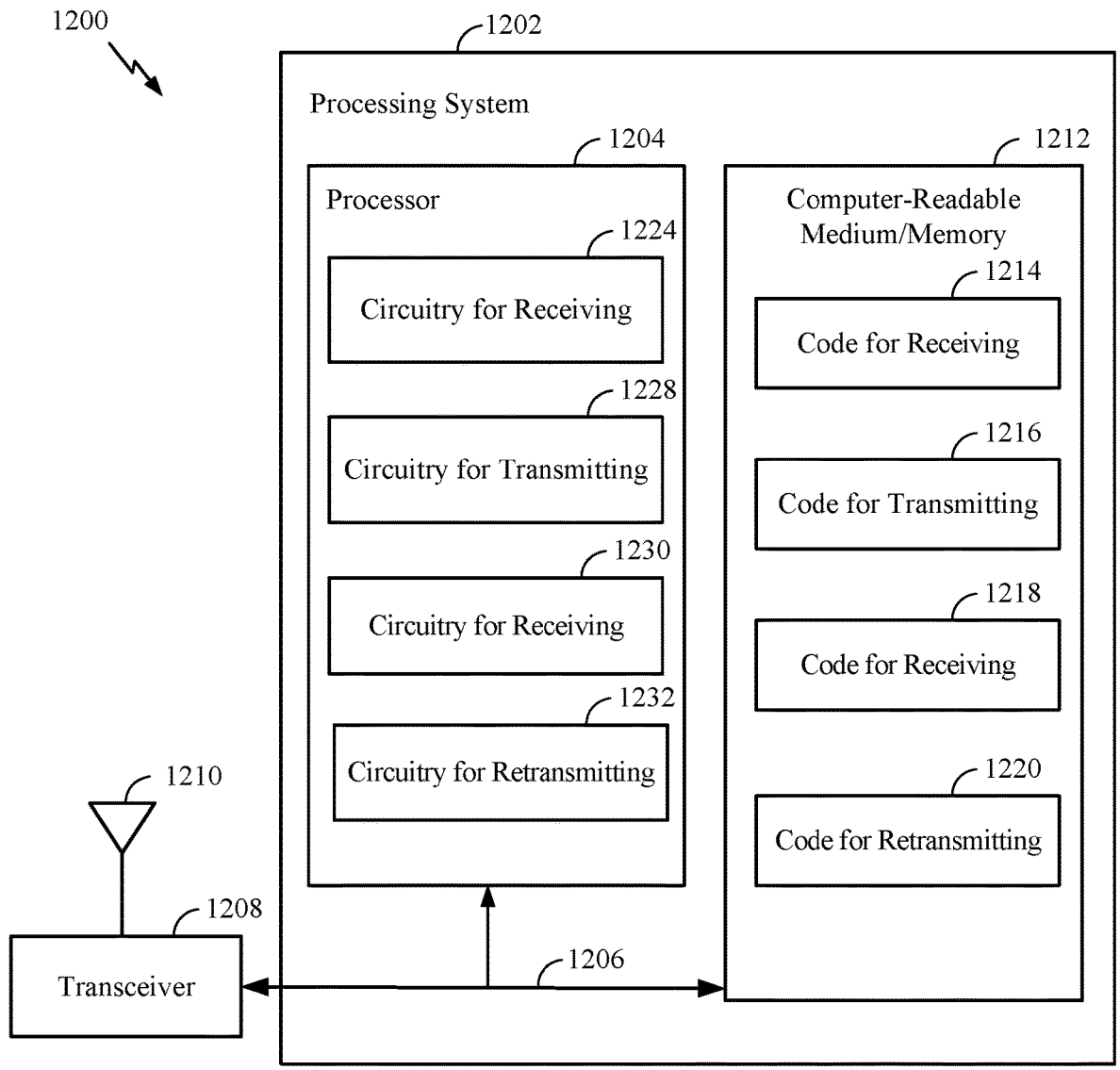
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9 and/or FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9 and/or FIG. 10, or other operations for performing the various techniques discussed herein for group SPS for path diversity. In certain aspects, computer-readable medium/memory 1212 stores code 1214 for receiving a configuration of one or more resources for a group of UEs including a first UE and a second UE, wherein the one or more resources includes one or more sidelink channels between the second UE and a first UE and an uplink channel between the second UE and a BS; code 1216 for transmitting data to the BS and the second UE using at least one of the one or more resources; code 1218 for receiving data from a first UE via one of the one or more sidelink channels; and/or code 1220 for retransmitting the data to the BS. In certain aspects, the processor 1204 has circuitry configured to implement the code stored in the computer-readable medium/memory 1212. The processor 1204 includes circuitry 1224 for receiving a configuration of one or more resources for a group of UEs including a first UE and a second UE, wherein the one or more resources includes one or more sidelink channels between the second UE and a first UE and an uplink channel between the second UE and a BS; circuitry 1228 for transmitting data to the BS and the second UE using at least one of the one or more resources; circuitry 1230 for receiving data from a first UE via one of the one or more sidelink channels; and/or circuitry 1232 for retransmitting the data to the BS.

For example, means for transmitting (or means for outputting for transmission) may include the transmitter unit 254 and/or antenna(s) 252 of the UE 120a illustrated in FIG. 2 and/or circuitry 1228 of the communication device 1200 in FIG. 12. Means for receiving (or means for obtaining) may include a receiver and/or antenna(s) 252 of the UE 120a illustrated in FIG. 2 and/or circuitry 1224 of the communication device 1200 in FIG. 12. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 1202 of the communication device 1200 in FIG. 12.

Example Aspects

In a first aspect, a method for wireless communications by a base station (BS), includes: configuring one or more user equipments (UEs) of a group of UEs with a configuration of one or more resources, wherein the one or more resources includes one or more sidelink channels between each of the UEs in the group of UEs and an uplink channel between the BS and each of the UEs in the group of UEs; and receiving data from at least one UE in the group of UEs via at least one of the uplink channels, wherein the data is associated with a different UE.

In a second aspect, in combination with the first aspect, the one or more resources comprises one or more semi-persistent scheduling (SPS) resources.

In a third aspect, in combination with one or more of the first and second aspects, the one or more resources are configured to be associated with one or more group identifiers (IDs) of the one or more groups of UEs.

In a fourth aspect, in combination with one or more of the first through third aspects, the BS transmits a downlink control information (DCI) from the BS to the at least one UE to activate at least one of the one or more resources for the at least one UE to transmit the data to the BS.

In a fifth aspect, in combination with one or more of the first through fourth aspects, the BS transmits a downlink control information (DCI) including an indication of an updated resource.

In sixth aspect, in combination with the fifth aspect, the DCI includes a request for a UE of the group of UEs to acknowledge the updated resource.

In a seventh aspect, in combination with one or more of the first through sixth aspects, the BS monitors one of the one or more resources for uplink data from a first UE in the group; and transmits an indication to a second UE of the at least one UE to retransmit the uplink data from the first UE when the uplink data from the first UE was not received in the one of the one or more resources.

In an eighth aspect, in combination with the seventh aspect, the indication is a group physical downlink control channel (PDCCH) message.

In a ninth aspect, in combination with the eighth aspect, the group PDCCH message includes one or more control messages, each control message includes a UE identifier (ID) that specifies a UE other than the first UE, and at least one of the control messages includes the UE ID of the second UE.

In a tenth aspect, in combination with one or more of the eighth and ninth aspect, the group PDCCH message includes at least one of: a resource allocation for retransmitting the uplink data, a modulation and coding scheme (MCS) for retransmitting the uplink data, a redundancy version (RV) for retransmitting the uplink data, a power control command for retransmitting the uplink data, or a combination thereof.

In an eleventh aspect, in combination with one or more of the seventh through tenth aspects, the group PDCCH message comprises a cyclic redundancy check (CRC) scrambled with a group of sidelinks (G-SL) radio network temporary identifier (G-SL-RNTI) associated with the first UE.

In a twelfth aspect, a method for wireless communications by a first user equipment (UE), comprising: receiving a configuration of one or more resources for a group of UEs including the first UE, wherein the one or more resources includes one or more sidelink channels between the first UE and a second UE and an uplink channel between the first UE and a base station (BS); and transmitting data to the BS and the second UE using at least one of the one or more resources.

In a thirteenth aspect, in combination with the twelfth aspect, the one or more resources comprise one or more semi-persistent scheduling (SPS) resources.

In a fourteenth aspect, in combination with one or more of the twelfth and thirteenth aspects, transmitting the data comprises transmitting the same data to the BS and the second UE concurrently.

In a fifteenth aspect, in combination with one or more of the twelfth through fourteenth aspects, transmitting the data comprises transmitting the data to the BS and the second UE via an omni-directional signal as a broadcast.

In a sixteenth aspect, in combination with one or more of the twelfth through fifteenth aspects, transmitting the data comprises transmitting the data to the BS using a first beam on the uplink channel, and transmitting the data to the second UE on a second beam on one of the one or more sidelink channels.

In a seventeenth aspect, in combination with one or more of the twelfth through sixteenth aspects, transmitting the data comprises transmitting the data to the second UE at a different time than transmitting the data to the BS.

In an eighteenth aspect, in combination with one or more of the twelfth through seventeenth aspects, the one or more resources are associated with one or more group identifiers (IDs) of one or more groups of UEs as indicated in the configuration.

In a nineteenth aspect, in combination with one or more of the twelfth through eighteenth aspects, the first UE receives a downlink control information (DCI) from the BS to activate the at least one of the one or more resources for transmitting the data.

In a twentieth aspect, in combination with one or more of the twelfth through nineteenth aspects, the first UE receives a downlink control information (DCI) including an indication of an updated resource.

In a twenty-first aspect, in combination with one or more of the twelfth through twentieth aspects, the DCI includes a request for the first UE to acknowledge the updated resource.

In a twenty-second aspect, a method for wireless communications by a second user equipment (UE), comprising: receiving a configuration of one or more resources for a group of UEs including the second UE, wherein the one or more resources includes one or more sidelink channels between the second UE and a first UE and an uplink channel between the second UE and a base station (BS); receiving data from the first UE via one of the one or more sidelink channels; and retransmitting the data to the BS.

In a twenty-third aspect, in combination with the twenty-second aspect, the one or more resources comprise one or more semi-persistent scheduling (SPS) resources.

In a twenty-fourth aspect, in combination with one or more of the twenty-second aspect and the twenty-third aspects, the one or more resources are associated with one or more group identifiers (IDs) of one or more groups of UEs as indicated in the configuration.

In a twenty-fifth aspect, in combination with one or more of the twenty-second aspect through twenty-fourth aspect, the first UE receives a downlink control information (DCI) including an indication of an updated resource.

In a twenty-sixth aspect, in combination with the twenty-fifth aspect, the DCI includes a request for the second UE to acknowledge the updated resource.

In a twenty-seventh aspect, in combination with one or more of the twenty-second through twenty-sixth aspects, the first UE stores the data from the first UE; and receives an indication from the BS to retransmit the data, wherein the retransmitting comprises retransmitting the stored data in response to receiving the indication from the BS.

In a twenty-eighth aspect, in combination with the twenty-seventh aspect, the indication from the BS is a group physical downlink control channel (PDCCH) message comprising one or more control messages for uplink retransmissions; each control message in the group PDCCH message includes a UE ID that specifies a UE other than first UE, and at least one of the control messages includes a UE ID of the second UE.

In a twenty-ninth aspect, in combination with the twenty-eighth aspect, the group PDCCH message comprises at least one of: a resource allocation for retransmitting the data, a modulation and coding scheme (MCS) for retransmitting the data, a redundancy version (RV) for retransmitting the data, a power control command for retransmitting the data, or a combination thereof.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 8-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a node, comprising:
 configuring one or more user equipments (UEs) of a group of UEs, including a first UE, with a configuration of resources, wherein the resources include one or more sidelink channels between the UEs in the group of UEs and the first UE and include an uplink channel between the node and each of the UEs in the group of UEs;

outputting a group physical downlink control channel (PDCCH) message,
wherein the group PDCCH message comprises one or more control messages,
wherein each of the one or more control messages includes a UE identifier of a UE of the group of UEs, other than of the first UE, to retransmit data of the first UE, received via a sidelink channel, of the one or more sidelink channels, between the UE and the first UE, to the node, and
wherein at least one of the one or more control messages includes a UE identifier of a second UE of the group of UEs; and
obtaining the data of the first UE from the second UE via the uplink channel between the node and the second UE.

2. The method of claim 1, wherein the resources comprise semi-persistent scheduling (SPS) resource.

3. The method of claim 1, wherein the resources are configured to be associated with a group identifier (ID) of the group of UEs.

4. The method of claim 1, further comprising:
transmitting a downlink control information (DCI) from the node to the second UE to activate at least one of the resources for the second UE to transmit the data to the node.

5. The method of claim 1, further comprising:
transmitting a downlink control information (DCI) including an indication of an updated resource.

6. The method of claim 5, wherein the DCI includes a request for a UE of the group of UEs to acknowledge the updated resource.

7. The method of claim 1, further comprising:
monitoring one or more of the resources for uplink data from the first UE; and
transmitting the at least one of the one or more control messages with the UE identifier of the second UE when the uplink data from the first UE was not received in the one or more of the resources.

8. The method of claim 1, wherein the group PDCCH message includes at least one of:
a resource allocation for retransmitting the data on the uplink channel between the node and the second UE,
a modulation and coding scheme (MCS) for retransmitting the data on the uplink channel between the node and the second UE,
a redundancy version (RV) for retransmitting the data on the uplink channel between the node and the second UE,
a power control command for retransmitting the data on the uplink channel between the node and the second UE, or
a combination thereof.

9. The method of claim 1, wherein the group PDCCH message comprises a cyclic redundancy check (CRC) scrambled with a group of sidelinks (G-SL) radio network temporary identifier (G-SL-RNTI) associated with the first UE.

10. A method for wireless communications by a first user equipment (UE), comprising:
receiving a configured grant (CG) of semi-persistent scheduling (SPS) resources for a group of UEs including the first UE and a second UE, wherein the SPS resources of the CG include one or more sidelink channels between the first UE and the second UE and include an uplink channel between the first UE and a node; and
transmitting, based on the CG of the SPS resources, an initial transmission of data to the node on the uplink channel and the same data destined for the node, concurrently, to the second UE on a sidelink channel of the one or more sidelink channels.

11. The method of claim 10, wherein the transmitting comprises transmitting the data to the node and the same data to the second UE via an omni-directional signal as a broadcast.

12. The method of claim 10, wherein the transmitting comprises:
transmitting the data to the node using a first beam on the uplink channel, and
transmitting the same data to the second UE using a second beam on the sidelink channel of the one or more sidelink channels.

13. The method of claim 10, wherein the resources are associated with one or more group identifiers of the group of UEs.

14. The method of claim 13, further comprising:
receiving a downlink control information (DCI) from the node to activate one or more of the resources for transmitting the data.

15. The method of claim 10, further comprising:
receiving a downlink control information (DCI) from the node including an indication of an updated resource.

16. The method of claim 15, wherein the DCI includes a request for the first UE to acknowledge the updated resource.

17. A method for wireless communications by a second user equipment (UE), comprising:
receiving a configuration of resources for a group of UEs including the second UE, wherein the resources include one or more sidelink channels between the second UE and a first UE and include an uplink channel between the second UE and a node;
receiving data from the first UE via one of the one or more sidelink channels;
receiving a group physical downlink control channel (PDCCH) message from the node, wherein the group PDCCH message comprises one or more control message, wherein each of the one or more control messages includes a UE identifier of a UE other than of the first UE, and wherein at least one of the one or more control messages includes a UE identifier of the second UE; and
retransmitting the data received from the first UE to the node, via the uplink channel between the second UE and the node, in response to the at least one of the one or more control messages including the UE identifier of the second UE.

18. The method of claim 17, wherein the resources comprise semi-persistent scheduling (SPS) resources.

19. The method of claim 17, wherein the resources are associated with one or more group identifiers (IDs) of one or more groups of UEs as indicated in the configuration.

20. The method of claim 17, further comprising receiving a downlink control information (DCI) including an indication of an updated resource.

21. The method of claim 20, wherein the DCI includes a request for the second UE to acknowledge the updated resource.

22. The method of claim 17, further comprising:
    storing the data from the first UE, wherein the retransmitting comprises retransmitting the stored data.
23. The method of claim 17, wherein the group PDCCH message comprises at least one of:
    a resource allocation for retransmitting the data,
    a modulation and coding scheme (MCS) for retransmitting the data,
    a redundancy version (RV) for retransmitting the data,
    a power control command for retransmitting the data, or
    a combination thereof.
24. An apparatus for wireless communications, comprising:
    a memory storing computer executable code; and
    one or more processors coupled with the memory and configured to execute the computer executable code and cause the apparatus to:
        configure one or more user equipments (UEs) of a group of UEs, including a first UE, with a configuration of resources, wherein the resources include one or more sidelink channels between the UEs in the group of UEs and the first UE and include an uplink channel between the apparatus and each of the UEs in the group of UEs;
    output a group physical downlink control channel (PDCCH) message,
        wherein the group PDCCH message comprises one or more control messages,
        wherein each of the one or more control messages includes a UE identifier of a UE of the group of UEs, other than of the first UE, to retransmit data of the first UE, received via a sidelink channel, of the one or more sidelink channels, between the UE and the first UE, to the apparatus, and
        wherein at least one of the one or more control messages includes a UE
    identifier of a second UE of the group of UEs; and
    obtain the data of the first UE from the second UE via the uplink channel between the apparatus and the second UE.

\* \* \* \* \*